United States Patent [19]
Shioji et al.

[11] Patent Number: 6,037,431
[45] Date of Patent: Mar. 14, 2000

[54] SURFACTANT ABSORBING AGENT AND METHOD AND SURFACTANT CARRYING MATERIAL

[75] Inventors: Shorbu Shioji; Tomoki Gomi, both of Himeji; Takashi Namba, Suita, all of Japan

[73] Assignee: Nippon Shokubai Co., Ltd., Osaka, Japan

[21] Appl. No.: 08/849,254

[22] PCT Filed: Oct. 17, 1996

[86] PCT No.: PCT/JP96/03014

§ 371 Date: May 30, 1997

§ 102(e) Date: May 30, 1997

[87] PCT Pub. No.: WO97/14498

PCT Pub. Date: Apr. 24, 1997

[30] Foreign Application Priority Data

Oct. 20, 1995 [JP] Japan ................................ 7-273049
Dec. 1, 1995 [JP] Japan ................................ 7-314413

[51] Int. Cl.$^7$ .................................................. C08F 20/26
[52] U.S. Cl. ...................... 526/320; 526/287; 526/317.1; 526/318.3; 526/318.4; 526/321; 526/323; 526/325
[58] Field of Search ................................ 526/320, 321, 526/287, 317.1, 323, 325

[56] References Cited

U.S. PATENT DOCUMENTS

| | | | |
|---|---|---|---|
| 4,170,582 | 10/1979 | Mori et al. | 526/320 |
| 4,429,097 | 1/1984 | Chang et al. | 526/320 |
| 4,892,916 | 1/1990 | Hawe et al. | 526/304 |
| 4,911,860 | 3/1990 | Van Den Brom | 252/174.21 |
| 4,914,170 | 4/1990 | Chang et al. | 526/240 |

FOREIGN PATENT DOCUMENTS

| | | |
|---|---|---|
| 58-32641 | 2/1983 | Japan . |
| 60-12131 | 1/1985 | Japan . |
| 62-225244 | 10/1987 | Japan . |
| 2-253845 | 10/1990 | Japan . |
| 6-122896 | 5/1994 | Japan . |

*Primary Examiner*—Fred Zitomer
*Attorney, Agent, or Firm*—Kubovcik & Kubovcik

[57] ABSTRACT

Inexpensive absorbing agent and method for readily and satisfactorily collecting and removing a surfactant from a solution, such as a surfactant-containing liquid waste, are provided. The absorbing agent includes, for example, a crosslinked polymer having a polyoxyalkylene chain. The surfactant is absorbed by bringing the above-arranged absorbing agent into contact with the solution. A particularly preferable crosslinked polymer is produced by crosslinking polyalkylene glycol or polymerizing a monomeric component including a monomer based on (meta)acrylic ester expressed by General Formula below:

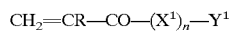

$$CH_2=CR-CO-(X^1)_n-Y^1$$

where R is a hydrogen atom or a methyl group, $X^1$ is an oxyalkylene group having up to 5 carbon atoms, $Y^1$ is a hydrogen atom, an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average.

7 Claims, 1 Drawing Sheet

SURFACTANT ABSORBING AGENT AND METHOD AND SURFACTANT CARRYING MATERIAL

TECHNICAL FIELD

The present invention relates to surfactant absorbing agent and method for absorbing a surfactant contained in a solution, and to a carrying material for carrying the surfactant. More precisely, the present invention relates to absorbing agent and method suited for collecting and removing a surfactant from a solution, such as a surfactant-containing liquid waste. The present invention also relates to a carrying material which turns a surfactant into gel to carry the same and renders a property for gradually releasing the surfactant (gradual releasing property).

TECHNICAL BACKGROUND

Surfactants, such as nonionic surfactants, are used when producing a polymer through suspension polymerization. When a reactor used in the suspension polymerization is washed, there is produced a liquid waste which contains such a high concentration of the surfactant that it can not be discharged untreated. The liquid waste is conventionally placed in a boiler to evaporate water and incinerate the surfactant, or treated with active sludge.

However, the first process is disadvantageous in that it takes a considerable time and costs more because a large quantity of water in the liquid waste must be evaporated. Also, the second process is disadvantageous in that the liquid waste can not be treated in a large quantity in a short time.

It is known that if anionic or cationic water soluble resin is added to a surfactant-containing aqueous solution, a part of the surfactant aggregates. Thus, it is possible to lower a concentration of the surfactant in the liquid waste by adding the water soluble resin to the surfactant-containing liquid waste to trigger the surfactant aggregation.

However, the water soluble resin is not effective enough to trigger satisfactory surfactant aggregation, and a concentration of the surfactant in the liquid waste can not be lowered to a level such that allows the discharge of the liquid waste. Moreover, the aggregated surfactant turns into colloid. As a result, not only does filter isolation becomes difficult, but also the treatment manipulation becomes complicated. Further, the water soluble resin is so expensive that it raises the treatment cost undesirably.

Thus, there has been an increasing need for an inexpensive absorbing agent and method which can readily and satisfactorily collect and remove the surfactant from, for example, a surfactant-containing liquid waste.

In other words, it is therefore a first object of the present invention to provide an inexpensive absorbing agent and method which can readily and satisfactorily collect and remove the surfactant from, for example, a surfactant-containing liquid waste.

The surfactant is generally used as detergents, and an aqueous solution of such detergents is prepared in an available container, such as a bucket and a wash basin.

However, an aqueous solution must be prepared each time the conventional detergents are used, which makes a cleaning or washing job tedious and time-consuming. In short, they are not easy to use. Therefore, there has been a demand for a method of speeding up and simplifying the cleaning or washing job using a carrying material which can carry the surfactant or an aqueous solution of the same instead of preparing an aqueous solution in a container. In other words, there has been an increasing need for a carrying material which can make the surfactant used as a detergent easy to use, that is, what has been sought after is a composition serving as a carrying material that carries (contains) the surfactant.

Japanese Laid-Open Patent Application No. 32641/1983 (Tokukaisho No. 58-32641) discloses a method of treating a water absorbent resin composed of a crosslinked polymer with a surfactant to improve the water absorbency. Also, Japanese Laid-Open Patent Application No. 122896/1994 (Tokukaihei 6-122896) discloses a method of adding a water soluble crosslinked polyacrylic acid to a surfactant to produce a detergent which can be blended with a large quantity of a moisture-keeping agent. However, these publications neither disclose nor indicate a technical idea of carrying the surfactant by a carrying material to make the surfactant easy to use.

It is therefore a second object of the present invention to provide a carrying material which can make the surfactant used as a detergent easy to use, that is, to provide a composition serving as a carrying material that carries (contains) the surfactant.

DISCLOSURE OF THE INVENTION

The inventors of the present invention continued the study of surfactant absorbing agent and method to fulfill the first object, and discovered that an absorbing agent including a crosslinked polymer having a polyoxyalkylene chain can remove the surfactant from the solution in a satisfactory manner; moreover, when brought into contact with a liquid waste, it can readily absorb the surfactant in a satisfactory manner.

In other words, to solve the above problems, an absorbing agent of the present invention is characterized in that it includes a crosslinked polymer and it can absorb at least 0.01 g/g of a surfactant.

According to the above arrangement, the absorbing agent, for example, can absorb the surfactant in the solution effectively.

Also, to solve the above problems, an absorbing agent of the present invention is characterized in that the crosslinked polymer has a polyoxyalkylene chain.

According to the above arrangement, since the absorbing agent includes a crosslinked polymer having a polyoxyalkylene chain, it renders excellent surfactant absorbing ability. Consequently, the absorbing agent can, for example, absorb the surfactant in the solution effectively, thereby making it possible to remove the surfactant in a satisfactory manner. In addition, after the absorbing agent absorbs the surfactant, the surfactant can be removed by a simple manipulation of isolating the absorbing agent through filtration.

To solve the above problems, an absorbing method of the present invention is characterized in that an absorbing agent, which is capable of absorbing at least 0.01 g/g of a surfactant and includes a crosslinked polymer, is brought into contact with a surfactant-containing solution.

According to the above method, the surfactant contained in the solution can be absorbed effectively. Consequently, it has become possible to remove the surfactant in a satisfactory manner.

Also, to solve the above problems, an absorbing method of the present invention is a method of absorbing the surfactant contained in a solution characterized in that an absorbing agent including a crosslinked polymer having a polyoxyalkylene chain is brought into contact with the solution.

According to the above method, since the absorbing agent including a crosslinked polymer having a polyoxyalkylene chain is used, the surfactant contained in the solution can be absorbed effectively. Thus, it has become possible to remove the surfactant in a satisfactory manner. The crosslinked polymer referred herein is an inexpensive one produced by crosslinking polyalkylene glycol, such as polyethylene glycol, or polymerizing a monomer based on (meth)acrylic ester in the presence of a crosslinking agent. Since the absorbing agent is inexpensive, the surfactant can be removed at a low cost. Further, since the absorbing agent precipitates after it has absorbed the surfactant, the surfactant can be removed by a simple manipulation of filter isolation.

Further, to fulfill the second object, the inventors of the present invention continued the study of a carrying material for carrying a surfactant, that is, a composition serving as a carrying material that carries (contains) the surfactant, and discovered that a carrying material including a crosslinked polymer produced by polymerizing a monomeric component including a monomer based on (meth)acrylic ester of a specific molecule structure can carry the surfactant. Also, the inventors discovered that the above carrying material turns the surfactant into gel to carry the same, and renders excellent shape keeping property while carrying the surfactant and a property of gradually releasing the surfactant (gradual releasing property). In other words, the inventors discovered that by carrying the surfactant using the above carrying material, the surfactant becomes easy to use as a detergent, for example.

More precisely, to solve the above problems, a carrying material of the present invention is a carrying material that carries a surfactant characterized by including a crosslinked polymer produced by polymerizing a monomeric component, including a monomer based on (meth)acrylic ester expressed by General Formula (2) below:

$$CH_2=CR-CO-(X^2)_n-Y^2 \quad (2)$$

where R is a hydrogen atom or methyl group, $X^2$ is an oxyalkylene group having 2–4 carbon atoms whose mole ratio of an oxyethylene group with respect to all the oxyalkylene groups is 50% or more, $Y^2$ is an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average.

According to the above arrangement, the carrying material turns the surfactant into gel to carry the same and renders excellent shape keeping property while carrying the surfactant and a property of gradually releasing the surfactant (gradual releasing property). In other words, carrying the surfactant by the carrying material makes it possible to make the easy-to-use surfactant used as a detergent, for example. Consequently, cleaning or washing job can be done faster and easier.

For a fuller understanding of the nature and advantages of the invention, reference should be made to the ensuing detailed description taken in conjunction with the accompanying drawings.

MOST PREFERRED EMBODIMENT

The following description will describe the present invention in detail. In the following, a crosslinked polymer included in an absorbing agent is referred to as a crosslinked polymer (A) and a crosslinked polymer included in a carrying material is referred to as a crosslinked polymer (B) for the explanation's convenience.

The crosslinked polymer (A) contained in the absorbing agent of the present invention is, for example, a polymer having a polyoxyalkylene chain and a crosslinking bond. In other words, the crosslinked polymer (A) is a polymer having a polyoxyalkylene chain as a main chain and a crosslinking bond, or a polymer having a polyoxyalkylene chain as a side chain and a crosslinking bond.

The crosslinked polymer (A) having a polyoxyalkylene chain as the main chain is not especially limited. However, a crosslinked polymer produced by crosslinking a polyalkylene glycol (hereinafter, referred to as crosslinked polyalkylene glycol) is preferable because it excels the others in surfactant absorbing ability.

Examples of polyalkylene glycol include, but are not limited to: polyethylene glycol, polypropylene glycol, polybutylene glycol, etc. Also, polyalkylene glycol may be a copolymer of at least two kinds of alkylene glycol. One or a mixture of at least two compounds selected from these examples can be used effectively. Of all these examples, the most preferred is polyethylene glycol, because it is inexpensive and a resulting crosslinked polyalkylene glycol excels the others in surfactant absorbing ability. A molecular weight of polyalkylene glycol is not especially limited and can be determined in accordance with desired physical properties or the like of the absorbing agent.

Crosslinked polyalkylene glycol is obtained by crosslinking the aforementioned polyalkylene glycol. Although a crosslinking method is not especially limited, polyalkylene glycol can be crosslinked, for example, through τ ray irradiation. When irradiating τ rays, it is preferable to do so using a solution of polyalkylene glycol, which is prepared by dissolving polyalkylene glycol into a solvent, such as water, because the crosslinking reaction can be controlled easily. An amount of the solvent is not especially limited, and is determined by taking the following into consideration: readiness in controlling the crosslinking reaction, economy, reaction yield, etc. Also, an adequate amount of irradiated τ rays can be selected depending on the kind, amount, and the like of polyalkylene glycol.

A product obtained as a result of the crosslinking reaction of polyalkylene glycol, namely, crosslinked polyalkylene glycol, may be dried under a reduced pressure as occasion demands. The dried crosslinked polyalkylene glycol can be used as the absorbing agent without any further treatment, but may be pulverized by a pulverizer, such as a hammer mill and jet mill, as occasion demands. In other words, crosslinked polyalkylene glycol may be made into particles of a specific shape, or undefined, spherical, leaflet, fibriform, bar-wise, granular, etc. shape.

The crosslinked polymer (A) having a polyoxyalkylene chain as the side chain is not especially limited, but the most preferred is a crosslinked polymer produced by polymerizing a monomeric component (which will be described below) including a monomer based on (meth)acrylic ester (hereinafter, referred to as monomer (1) based on (meth) acrylic ester) expressed by General Formula (1) below:

$$CH_2=CR-CO-(X^1)_n-Y^1 \quad (1)$$

where R is a hydrogen atom or methyl group, $X^1$ is an oxyalkylene group having up to 5 carbon atoms, $Y^1$ is a hydrogen atom, an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average, because it excels the others in surfactant absorbing ability.

The monomer (1) based on (meth)acrylic ester is a compound expressed by General Formula (1) above, where a substitutional group represented by R is a hydrogen atom or methyl group, an oxyalkylene group represented by $X^1$ has up to 5 carbon atoms, a repeating number of oxyalkylene groups represented by n is a positive number ranging from 3 to 100 in average, and a terminal group represented by $Y^1$ is a hydrogen atom, an alkoxy group having up to 5 carbon atoms, a phenoxy group, or an oxyalkylphenyl group having up to 3 alkyl groups each having up to 9 carbon atoms as a substitutional group.

The crosslinked polymer (B) contained in the carrying material of the present invention is produced by polymerizing a monomeric component including a monomer based on (meth)acrylic ester (hereinafter, referred to as a monomer (2) based on (meth)acrylic ester) expressed by General Formula (2) above. The above monomer (2) based on (meth)acrylic ester is a compound expressed by General Formula (2) above, where a substitutional group represented by R is a hydrogen atom or methyl group, an oxyalkylene group represented by $x^2$ has 2–4 carbon atoms whose mole ratio of an oxyethylene group with respect to all the oxyalkylene groups is 50% or more, a repeating number of oxyalkylene groups represented by n is a positive number ranging from 3 to 100 in average, and a terminal group represented by $Y^2$ is an alkoxy group having up to 5 carbon atoms, a phenoxy group, or an oxyalkylphenyl group having up to 3 alkyl groups each having up to 9 carbon atoms as a substitutional group.

Examples of the above monomers (1) and (2) both based on (meth)acrylic ester include: methoxypolyethylene glycol mono (meth)acrylate, methoxypolyethylene glycol.polypropylene glycol mono (meth)acrylate, methoxypolyethylene glycol.polybutylene glycol mono(meth)acrylate, ethoxypolyethylene glycol mono(meth)acrylate, ethoxypolyethylene glycol.polypropylene glycol mono (meth)acrylate, ethoxypolyethylene glycol.polybutylene glycol mono(meth) acrylate, phenoxypolyethylene glycol mono(meth)acryalte, benziloxypolyethylene glycol mono(meth) acrylate, etc. One or a mixture of at least two compounds selected from these examples can be used effectively.

In case of the carrying material, using a compound whose above-specified mole ratio is less than 50%, such as alkoxypolypropylene glycol mono(meth)acrylate and phenoxypolybutylene glycol mono(meth)acrylate, instead of the above example compounds is not preferable because the physical properties or characteristics of the resulting crosslinked polymer (B), namely, the carrying material, are degraded. To be more specific, it is not preferable because the shape keeping property, a property of gradually releasing the surfactant (gradual releasing property), liquid permeability, dispersibility, or absorbing rate, etc. are degraded. Also, using a compound like polyethylene glycol mono(meth) acrylate having a hydroxyl group at the terminal end, that is, a compound whose terminal end is not composed of a hydrophobic hydrocarbon group, instead of the above example compounds is not preferable either, because the physical properties or characteristics of the resulting crosslinked polymer (B), namely, the carrying material, are degraded.

Besides the monomers (1) and (2) both based on (meth) acrylic ester, a monomeric component used as a raw material of the crosslinked polymers (A) and (B) may include a monomer copolymerizable with the monomers (1) and (2) both based on (meth)acrylic ester (which is referred to as copolymerizable monomer, hereinafter). The copolymerizable monomer is not especially limited, and various kinds of compounds are available.

Examples of the copolymerizable monomer include:

monomers based on unsaturated monocarboxylic acid, such as acrylic acid, methacrylic acid, crotonic acid, and a neutralized or partially neutralized product of these acids;

monomers based on unsaturated dicarboxylic acid, such as maleic acid, fumaric acid, itaconic acid, citraconic acid, and a neutralized or partially neutralized product of these acids;

monomers based on unsaturated sulfonic acid, such as vinyl sulfonic acid, allyl sulfonic acid, methallyl sulfonic acid, styrene sulfonic acid, 2-acrylamide-2-methylpropane sulfonic acid, sulfoethyl (meth)acryalte, sulfopropyl (meth)acrylate, 2-hydroxysulfopropyl (meth)acrylate, sulfoethylmaleimide, 3-allyloxy-2-hydroxypropane sulfonic acid, and a neutralized or partially neutralized product of these acids;

amide-based monomers, such as (meth)acrylamide, isopropyl acrylamide, t-butyl(meth)acrylamide;

hydrophobic monomers, such as (meth)acrylic ester, styrene, 2-methyl styrene, and vinyl acetate;

hydroxyl-group-containing unsaturated monomers, such as 2-hydroxy ethyl(meth)acrylate, polyethylene glycol mono(meth)acrylate, polypropylene glycol mono (meth)acryalte, allyl alcohol, polyethylene glycol monoallyl ether, polypropylene glycol monoallyl ether, 3-methyl-3-butene-1-ole(isoprenol), polyethylene glycol monoisoprenol ether, polypropylene glycol monoisoprenol ether, 3-methyl-2-butene-1-ole(prenol), polyethylene glycol monoprenol ether, polypropylene glycol monoprenol ether, 2-methyl-3-butene-2-ole (isoprene alcohol), polyethylene glycol monoisoprene alcohol ether, polypropylene glycol monoisoprene alcohol ether, N-methylol (meth)acrylamide, glycerol mono(meth)acrylate, glycerol monoallyl ether, and vinyl alcohol;

cationic monomers, such as dimethyl aminoethyl(meth) acrylate, and dimethyl aminopropyl(meth)acrylamide;

nitrile-based monomers, such as (meth)acrylonitrile;

phosphorous-containing monomers, such as (meth) acrylamide methane phosphonic acid, (meth) acrylamide methane phosphonic acid methyl ester, and 2-(meth)acrylamide-2-methyl propane phosphonic acid; etc.

The neutralized or partially neutralized product of the above monomers based on unsaturated monocarboxylic acid, unsaturated dicarboxylic acid, and unsaturated sulfonic acid is obtained by neutralizing the corresponding compound with a monovalent metal, divalent metal, ammonia, or organic amine. One or a mixture of at least two compounds selected from these examples can be used effectively. Of all these examples, particularly preferred are monomers based on unsaturated monocarboxylic acid, unsaturated sulfonic acid, and mixtures of these two kinds of acids, because they are inexpensive and render excellent copolymerability.

In case of the carrying material, a monomeric component made of the monomer (2) based on (meth)acrliyic ester and copolymerizable monomer is polymerized in such a manner that a ratio of the monomer (2) based on (meth)acrylic ester with respect to a total amount of the monomeric component is in a range between 20 wt % and 100 wt % to produce the crosslinked polymer (B). In other words, the crosslinked polymer (B) of the present invention is produced by polymerizing the aforementioned monomeric component composed of the monomer (2) based on (meth)acrylic ester and copolymerizable monomer in a weight ratio (monomer (2) based on (meth)acrylic ester/copolymerizable monomer) ranging from 20/80 to 100/0, and more preferably 40/60 to 90/10. Containing less than 20 wt % of the monomer (2) based on (meth)acrylic ester is not preferable, because the physical properties and characteristics of the resulting crosslinked polymer (B), namely, the carrying material, are degraded. In case of the absorbing agent, an amount of the copolymerizable monomer is not especially limited as long as the physical properties are maintained at a satisfactory level.

In the present invention, a solvent may be used when copolymerizing the monomeric component. The solvent referred to herein is a liquid into which the monomeric component is dissolved, for example, water or a hydrophilic organic solvent which can be mixed with water homogeneously. Examples of the organic solvent include:

lower alcohols having up to 4 carbon atoms, such as methyl alcohol and ethyl alcohol;

lower ketones, such as acetone;

dimethyl formamide, dimethylsulfoxide; etc.

One or a mixture of at least two solvents selected from these examples can be used effectively. When a mixture of at least two solvents is used, an adequate mixing ratio can be selected depending on kind or the like of the monomeric component. In case of reverse phase suspension polymerization (which will be described below), a hydrophobic organic solvent may be used.

An amount of the solvent, that is, a concentration of the monomeric component in the solvent (hereinafter, referred to as a monomer concentration) is not especially limited; however, when control readiness in polymerization reaction, economy, reaction yield, etc. are considered, a preferable monomer concentration is 20 wt % or higher up to a saturation concentration, a more preferable monomer concentration is in a range between 30 wt % and 95 wt %, and the most preferable monomer concentration is in a range between 55 wt % and 80 wt %. The monomer concentration less than 20 wt % is not preferable, because the solvent is excessive, and hence, economy, reaction yield, etc. are lowered. The monomer concentration above the saturation concentration is not preferable either, because the polymerization reaction does not take place homogeneously, and it becomes difficult to remove a reaction heat (polymerization heat) generated by the polymerization reaction.

In the present invention, a crosslinking agent may be used optionally when copolymerizing the monomeric component. Examples of the crosslinking agent include:

compounds having at least 2 ethylene-based unsaturated groups within a molecule, such as ethylene glycol di(meth) acrylate, diethylene glycol di(meth)acrylate, triethylene glycol di(meth)acrylate, propylene glycol di(meth)acrylate, polyethylene glycol di(meth)acrylate, trimethylolpropane tri(meth)acrylate, pentaerythritol tri(meth)acrylate, pentaerythritol di(meth)acrylate, N,N-methylene-bis acrylamide, triallyl isocyanurate, and trimethylol propane diallyl ether;

polyhydroxy alcohols, such as ethylene glycol, diethylene glycol, triethylene glycol, polyethylene glycol, glycerin, polyglycerin, propylene glycol, diethanol amine, triethanol amine, polypropylene glycol, polyvinyl alcohol, pentaerythritol, sorbitol, sorbitan, glucose, mannitol, mannitan, cane sugar, and grape sugar;

polyepoxy compounds, such as ethylene glycol diglycidyl ether, glycerin diglycidyl ether, polyethylene glycol diglycidyl ether, propylene glycol diglycidyl ether, polyproplylene glycol diglycidyl ether, neopentyl glycol diglycidyl ether, 1,6-hexanediol diglycidyl ether, trimethylol propane diglycidyl ether, trimethylol propane triglycidyl ether, and glycerin triglycidyl ether; etc. One or a mixture of at least two crosslinking agents selected from these examples can be used effectively.

Using the crosslinking agent(s) makes it possible to set crosslinking density of the crosslinked polymers (A) and (B) at an arbitrary value. Of all the example crosslinking agents, the most preferred is polyethylene glycol di(meth) acrylate. The number of addition moles of ethylene oxides (hereinafter, referred to as EO) forming polyethylene glycol di(meth) acrylate is preferably in a range between 4 and 100, and more preferably in terms of crosslinking efficiency, in a range between 5 and 50.

When a compound other than polyethylene glycol di(meth) acrylate is used as the crosslinking agent, it is preferable to also use polyethylene glycol di(meth) acrylate.

In the crosslinked polymer (A) contained in the absorbing agent, a preferable mole ratio of the crosslinking agent to the monomeric component is in a range between $1 \times 10^{-5}$ and $5 \times 10^{-2}$, and the most preferable is in a range between $5 \times 10^{-4}$ and $2 \times 10^{-2}$. A mole ratio smaller than $1 \times 10^{-5}$ is not preferable, because crosslinking density of the resulting crosslinked polymer (A) becomes so low that the absorbing ability of the absorbing agent is reduced. A mole ratio above $5 \times 10^{-2}$ is not preferable either, because crosslinking density of the resulting crosslinked polymer (A) becomes so high that the absorbing ability of the absorbing agent is reduced.

In the crosslinked polymer (B) contained in the carrying material, a preferable mole ratio of the crosslinking agent to the monomeric component is in a range between $1 \times 10^{-5}$ and $5 \times 10^{-2}$, and the most preferable is in a range between $5 \times 10^{-4}$ and $2 \times 10^{-2}$. A mole ratio smaller than $1 \times 10^{-5}$ is not preferable, because crosslinking density of the resulting crosslinked polymer (B) becomes so low that the physical properties and characteristics of the carrying material are degraded. A mole ratio above $5 \times 10^{-2}$ is not preferable either, because crosslinking density of the resulting crosslinked polymer (B) becomes so high that the physical properties and characteristics of the carrying material are degraded.

When a polyhydroxy alcohol is used as the crosslinking agent, it is preferable to subject a reaction product of the polymerization reaction to heat treatment at temperatures ranging from 150° C. to 250° C. Also, when a polyepoxy compound is used as the crosslinking agent, it is also preferable to subject a reaction product of the polymerization reaction to heat treatment at temperatures ranging from 50° C. to 250° C.

The crosslinked polymers (A) and (B) are produced by polymerizing the monomeric component in the presence of the crosslinking agent, solvent, and a polymerization initiator through known polymerization methods, such as solution polymerization, suspension polymerization, and reverse phase suspension polymerization. Besides these three polymerization methods, the followings are also applicable to produce the crosslinked polymers (A) and (B): cast molding polymerization, thin film forming polymerization, spray polymerization, and a method wherein a 2-arm type kneader is used as a reactor and a reaction product is cut into small pieces by a shear force of the kneader.

Examples of the polymerization initiator include, but are not limited to, radical polymerization initiators:

hydrogen peroxide;

persulfates, such as sodium persulfate, ammonium persulfate, and potassium persulfate;

water-soluble azo compounds, such as 2,2'-azobis(2-amidinopropane) dihydrochloride and 4,4,'-azobis(4-cyanovalerate);

oil-soluble azo compounds, such as 2,2'-azobis isobutyronitrile, 2,2'-azobis(4-methoxy-2,4-dimethyl valeronitrile; and organic peroxides, such as benzoyl peroxide, lauroyl peroxide, peracetic acid, benzoyl peroxide, and cumene hydroperoxide.

One or a mixture of at least two polymerization initiators selected from these examples can be used effectively. Also, a reducing agent that promotes the decomposition of the polymerization initiator may be additionally used, so that the polymerization initiator and reducing agent serve as a redox initiator. Examples of the reducing agent include, but are not limited to: (bi)sulfite/(bi)sulfuros acid, such as sodium hydrogensulfite, L-ascorbic acid/L-ascorbate, reducing metal or reducing metal salt, such as ferrous salt, amines, etc. The polymerization reaction may be initiated by irradiating radial rays, electron beams, UV rays, etc. to the reaction system instead of using the polymerization initiator.

In case of the reverse phase suspension polymerization, a dispersing agent is used to disperse an aqueous solution of the monomeric component in a hydrophobic organic solvent, and examples of which include:

sorbitan fatty acid ester, cane sugar fatty acid ester, glycerin fatty acid ester, polyglycerin fatty acid ester, ethyl cellulose, and cellulose ester, such as cellulose acetate;

cellulose ether;

carboxyl-group-containing polymers, such as α-olefin-maleic acid anhydride copolymer; etc. The hydrophobic organic solvent is not especially limited.

A reaction temperature varies with kinds, combination, and amount of the monomeric component, crosslinking agent, solvent, and polymerization initiator. However, a relatively low temperature is preferable to complete the reaction and produce crosslinked polymers (A) and (B) having a large molecular weight. For example, a preferable reaction temperature is in a range between 20° C. and 100° C. A reaction time is not especially limited, and can be determined in response to the reaction temperature and the like. A reactor, for example, the one used for the polymerization reaction, is not especially limited. However, a 2-arm type kneader is preferable, because the reaction product can be readily pulverized after the polymerization reaction, which will be described below.

During the polymerization reaction, the reactant system is either stirred or allowed to stand. That is, the reactant system may undergo stirring polymerization or standing polymerization, or a combination of the both. However, standing polymerization is preferred, because the crosslinked polymer (A), namely, absorbing agent, rendering excellent absorbing ability can be produced efficiently. Standing polymerization is advantageous in that the resulting crosslinked polymer (B) contains less amount of soluble components. Thus, the standing polymerization can efficiently produce the crosslinked polymer (B), namely, the carrying material, rendering excellent physical properties and characteristics, such as shape keeping property, gradual releasing property, and liquid permeability, dispersibility, or absorbing rate. In case of the standing polymerization, it is preferable to pulverize the resulting reaction product after the polymerization reaction. The resulting reaction product of the standing polymerization can be readily pulverized.

The reaction product of the polymerization reaction is dried using a drier or the like without any further treatment or after an amount of remaining monomers in the same is optionally lowered by adding oxygen-containing reducing inorganic salts, such as sulfite, hydrogensulfite, pyrosulfite, dithionite, nitrite, phosphite, and hypo-phosphite. A preferable drying temperature is in a range between 100° C. and 160° C., and more preferable drying temperature is in a range between 120° C. and 140° C. It is particularly preferable to dry the reaction product under a reducing pressure (vacuum drying) or in an inert gas flow. The resulting dried product, namely, the crosslinked polymers (A) and (B), is pulverized by a pulverizer, such as a hammer mill and jet mill as occasion demands. Drying below 100° C. is not preferable because it takes a considerable time to dry the reaction product satisfactorily. Drying above 160° C. is not preferable either, because the resulting crosslinked polymers (A) and (B) are deteriorated by the heat, and therefore, absorbing ability of the crosslinked polymer (A), namely, the absorbing agent, tends to deteriorate. Also, the physical properties and characteristics of the crosslinked polymer (B), namely, the carrying material, tend to deteriorate.

The absorbing agent and carrying material of the present invention, namely, the crosslinked polymers (A) and (B), may be made into particles of a specific shape, or undefined, spherical, leaflet, fibriform, bar-wise, granular, etc. shape. Further, the crosslinked polymers (A) and (B) may be primary particles or granules of the primary particles. An average particle size of the crosslinked polymers (A) and (B) can be set arbitrary depending on the kind of the monomeric component or the use of the absorbing agent and carrying material, and a preferable particle size is in a range between some microns and some hundreds microns. A method of making the crosslinked polymers (A) and (B) into particles is not especially limited as long as the physical properties or characteristics are satisfactory.

Surface processing or modification may be applied to the crosslinked polymers (A) and (B) to improve the physical properties and characteristics (absorbing ability), such as liquid permeability, dispersibility, and absorbing rate. In other words, surface treatment or the like may be applied to the vicinity of the surface of the crosslinked polymers (A) and (B) to introduce a crosslinking structure. By so doing, an initial absorbing rate (absorbing rate immediately after the absorbing action has started) of the crosslinked polymer (B) is further increased.

Preferable examples of the surface crosslinking agent used in the above surface processing are, when the crosslinked polymers (A) and (B) contain a carboxyl group and/or a carboxylate group, compounds containing at least 2 functional groups reactive with the carboxyl group and/or carboxylate group in a molecule. Examples of the surface crosslinking agent include:

polyhydroxy alcohols, such as glycerin, ethylene glycol, and pentaerythritol;

polyepoxy compounds, such as ethylene glycol diglycidyl ether;

polyamines, such as ethylene diamine, diethylene triamine, triethylene tetramine, tetraethylene pentamine, pentaethylene hexamine, and polyethylene imine;

polyaldehydes, such as glutaraldehyde and glyoxal;

polyvalent metal salts, such as (poly)aluminum chloride, magnesium chloride, calcium chloride, aluminum sulfate, magnesium sulfate, and calcium sulfate; etc. One or a mixture of at least two surface crosslinking agents selected from these examples can be used effectively.

An amount of the surface crosslinking agent is not especially limited, but a preferable range is between 0.005 wt % and 5 wt % based on a weight of each of the crosslinked polymers (A) and (B). A method of the surface processing is not especially limited either. For example, a solid surface crosslinking agent or a solution of the same made by being dissolved into an available solvent is mixed with the powders of crosslinked polymers (A) and (B), and heated later as occasion demands. Alternatively, after the crosslinked polymers (A) and (B) are dispersed in a hydrophobic organic solvent, a surface crosslinking agent is added to the dispersed liquid and heated as occasion demands.

Further, an addition agent, such as a bulking agent made of inorganic microscopic powders like silica microscopic powders, pulp fibers, etc. may be added to the absorbing agent to facilitate the processing and quality of the absorbing agent.

Likewise, the followings may be added to the carrying material to facilitate the processing and quality of the carrying material:

a bulking agent made of inorganic microscopic powders like silica microscopic powders, pulp fibers, etc.;

deodorants mainly made of activated carbon, carbon black, iron phthalocyanine derivative, zeolite having absorbed vegetable essential oil or the like;

aromatics;

anti-bacterial agents, germicide agents, anti-mildew agent, and anit-rotting agents, mainly made of metals, such as silver, copper, and zinc;

oxygen scavenger (anti-oxidant);

foaming agent;

coloring materials, such as pigments and dyes;

perfumes; etc.

Adding these addition agent(s) can give various functions to the carrying material.

For example, a carrying material containing a surfactant, a deodorant, water, and optionally a lower alcohol, such as ethyl alcohol, that is, a composition serving as a carrying material carrying (containing) the surfactant together with the deodorant, is useful as a deodorant composition. Also, a carrying material including a surfactant, an aromatic (or perfume), water, and optionally a lower alcohol, such as ethyl alcohol, that is, a composition serving as a carrying material carrying (containing) the surfactant together with the aromatic (or perfume), is useful as an aromatic composition.

An amount of the addition agent is not especially limited, and can be determined depending on the kind or the like of the addition agent. An adding method of the addition agent is not especially limited, either.

Surfactants to be treated by the absorbing agent of the present invention are preferably in the form of solution. The solution only has to include the surfactant, and element make-up is not especially limited. In other words, a liquid, which is a main component of the solution, may be water or an organic solvent, or a mixture of the both. In addition, besides the surfactant, inorganic salt or the like may be dissolved into a liquid waste.

Surfactants that the absorbing agent can absorb include, but are not limited to: nonionic surfactant, anionic surfactant, cationic surfactant, amphoteric surfactant, polymer surfactant, reactive surfactant, etc. The absorbing agent of the present invention is particularly suitable for absorbing the nonionic surfactant.

Examples of the nonionic surfactant include:

polyoxyethylene alkyl ether and polyoxyethylene alkylallyl ether;

sorbitan fatty acid ester and polyoxyethylene sorbitan fatty acid ester;

fatty acid monoglycerides, such as glycerol monolaurate;

polyoxyethylene-polyoxypropylene copolymer;

condensation product of ethylene oxide, aliphatic amine, aliphatic amide or acid; etc. More than one surfactant may be present in the liquid waste.

A concentration of the surfactant in the solution is not especially limited. However, the absorbing agent of the present invention fully exhibits the absorbing characteristics when it includes a relatively high concentration of the surfactant, for example, 100 ppm.

A preferable amount of the above-arranged absorbing agent is in a range between 0.01 part by weight and 1 part by weight with respect to 100 parts by weight of a surfactant-containing liquid waste. Containing less than 0.01 part by weight of the absorbing agent is not preferable, because a concentration of the surfactant is not reduced satisfactorily. Containing more than 1 part by weight of the absorbing agent is not preferable either, because the effect is not necessarily increased in response to an increased amount of the absorbing agent and some of the absorbing agent is wasted.

To treat the solution using the absorbing agent, the absorbing agent is brought into contact with the solution, and a method of which is not especially limited. For example, when the solution is withheld in a container, the absorbing agent may be directly put into (added to) the solution. Alternatively, the absorbing agent may be placed into a tea-bag sack made of a water permeable material, and the sack is dipped in the solution. Further, the solution may be put into (added to) the absorbing agent placed in a container, or the solution may penetrate through the absorbing agent, so that the solution can be treated continuously.

The absorbing agent of the present invention can absorb at least 0.01 g/g of the surfactant, and more preferably, 0.01 g–0.1 g/g of the surfactant. The absorbing agent can absorb the surfactant in the liquid only by being brought into contact with the solution. However, the absorbing agent and solution may be stirred or mixed as occasion demands. A temperature of the solution and contacting time are not especially limited.

After the solution is treated with the absorbing agent, the absorbing agent turns into insoluble gel. In case that the solution is put into the absorbing agent or the absorbing agent is put into the solution, the insoluble gel precipitates after the treatment, and therefore can be isolated from the solution through filtration. In case that a tea-bag sack is used or the solution penetrates through the absorbing agent, the solution does not contain any precipitate after the treatment, and a manipulation of the filter isolation can be omitted.

A concentration of the surfactant in the solution treated with the absorbing agent in the above manner is lowered to a satisfactory level, so that the solution can be discharged without any further treatment. On the other hand, the absorbing agent can be incinerated or recycled after the treatment.

The above-arranged absorbing agent may be blended (combined) with fiber, non-woven fabric, rubber, synthetic resin, or the like and made into a sheet or fibriform of complex. The complex thus made is particularly suitable when the solution penetrates through the absorbing agent.

As has been explained, the absorbing agent of the present invention includes the crosslinked polymer (A) and is able to absorb at least 0.01 g/g of the surfactant. Consequently, the above absorbing agent can absorb the surfactant in the solution efficiently.

Also, as has been explained, the crosslinked polymer (A) of the absorbing agent of the present invention is arranged to have a polyoxyalkylene chain. According to the above arrangement, since the absorbing agent includes the crosslinked polymer (A) having a polyoxyalkylene chain, it renders excellent surfactant absorbing ability. Consequently, the absorbing agent can absorb the surfactant in the solution efficiently, thereby making it possible to remove the surfactant in a satisfactory manner. Also, the surfactant can be removed by a simple manipulation, that is, the surfactant can be removed by isolating the absorbing agent which has absorbed the surfactant from the solution through filtration.

As has been explained, the crosslinked polymer (A) of the absorbing agent of the present invention is produced by crosslinking polyalkylene glycol. According to the above arrangement, the absorbing agent can further improve the surfactant absorbing ability, thereby making it possible to remove the surfactant in a more satisfactory manner. The crosslinked polymer (A) is produced at a low cost by crosslinking polyalkylene glycol, such as polyethylene glycol. Therefore, since the crosslinked polymer (A) is inexpensive, the solution can be treated at a low cost too.

As has been explained, the crosslinked polymer (A) of the absorbing agent of the present invention is produced by polymerizing a monomeric component including the monomer (1) based on (meth)acrylic ester expressed by General Formula (1) below:

$$CH_2=CR-CO-(X^1)_n-Y^1 \qquad (1)$$

where R is a hydrogen atom or methyl group, $X^1$ is an oxyalkylene group having up to 5 carbon atoms, $Y^1$ is a hydrogen atom, an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average. According to the above arrangement, the absorbing agent can further improve the surfactant absorbing ability, thereby making it possible to remove the surfactant in a more satisfactory manner. In addition, the crosslinked polymer (A) is produced at a low cost by polymerizing the monomer (1) based on (meth)acrylic ester in the presence of a crosslinking agent. Therefore, since the crosslinked polymer (A) is inexpensive, the solution can be treated at a low cost too.

As has been explained, in an absorbing method of the present invention, the absorbing agent, which includes the crosslinked polymer (A) and is able to absorb at least 0.01 g/g of the surfactant, is brought into contact with a surfactant-containing solution. According to the above method, the surfactant contained in the solution can be absorbed efficiently, thereby making it possible to remove the surfactant in a satisfactory manner.

As has been explained, the absorbing method of the present invention is a method of absorbing the surfactant contained in the solution, wherein the absorbing agent including the crosslinked polymer (A) having a polyoxyalkylene chain is brought into contact with the solution. According to the above method, since the absorbing agent including the crosslinked polymer (A) having a polyoxyalkylene chain is used, the surfactant contained in the solution can be absorbed efficiently, thereby making it possible to remove the surfactant in a satisfactory manner.

Also, since the absorbing agent having absorbed the surfactant precipitates, the surfactant can be isolated from the solution through filtration. Consequently, it has become possible to readily collect and remove the surfactant from the surfactant-containing solution in a satisfactory manner at a low cost.

On the other hand, the above-arranged crosslinked polymer (B), that is, the carrying material of the present invention, can carry various kinds of surfactants including, but not limited to those specified above. The carrying material of the present invention is particularly suitable for carrying the nonionic surfactant. Examples of the nonionic surfactant are specified above, and the carrying material may carry one or a mixture of at least two surfactants selected from these examples.

An aqueous solution of the surfactant is preferable when it is carried by the carrying material. A concentration of the surfactant in the aqueous solution is not especially limited. The carrying material of the present invention can carry the surfactant in a satisfactory manner even when the surfactant solution has a relatively high concentration, for example, about 50 wt %. An amount of the carrying material is not especially limited, but some parts by weight of the carrying material is sufficient with respect to 100 parts by weight of the surfactant solution. In case of a liquid surfactant, a solution of the same does not have to be prepared, because it can be carried by the carrying material directly.

To let the carrying material carry the surfactant or an aqueous solution thereof (hereinafter, collectively referred to simply as the surfactant for the explanation's convenience), the carrying material and surfactant are brought into contact, and a method of which is not especially limited. For example, when the surfactant is withheld in a container or the like, the carrying material is placed into the surfactant. Alternatively, the carrying material is spread over a flat plate, and the surfactant is scattered over the carrying material. Although the carrying material can carry the surfactant upon contact, the carrying material and surfactant may be stirred or mixed as occasion demands. The carrying material turns the surfactant into insoluble gel, that is, the carrying material turns the surfactant into gel to carry the same. Consequently, a composition serving as the carrying material carrying (containing) the surfactant (which is referred to as surfactant-containing composition, hereinafter) is produced. A temperature, contacting time and the like when making the carrying material carry the surfactant are not especially limited.

When the surfactant is used as a detergent, the surfactant may be carried by the carrying material in advance or immediately before the actual use. In other words, a time (timing) for producing the surfactant-containing composition by making the carrying material carry the surfactant is not especially limited. Also, in this case, water may be additionally absorbed by or added to the carrying material (or surfactant-containing composition) during the actual use.

As has been explained, the carrying material of the present invention includes the crosslinked polymer (B) produced by polymerizing a monomeric component including the monomer (2) based on (meth)acrylic ester expressed by General Formula (2) below:

$$CH_2=CR-CO-(X^2)_n-Y^2 \qquad (2)$$

where R is a hydrogen atom or methyl group, $X^2$ is an oxyalkylene group having 2–4 carbon atoms whose mole ratio of an oxyethylene group with respect to all the oxyalkylene groups is 50% or more, $Y^2$ is an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average. In short, the surfactant-containing composition is arranged to include the crosslinked polymer (B) and surfactant. Also, as has been explained, the carrying material of the present invention is arranged to carry the nonionic surfactant. In other words, the surfactant-containing composition is arranged to include the nonionic surfactant as the surfactant to be carried.

The above-arranged carrying material turns the surfactant into gel to carry the same, and renders excellent shape keeping property while carrying the surfactant and excellent gradual releasing property. Thus, when carried by the carrying material, the surfactant used as a detergent, for example, has become more easy to use. Consequently, the cleaning or washing job becomes less tedious and less time-consuming. The above-arranged carrying material also renders excellent durability, heat resistance, and light resistance. Since the carrying material turns the surfactant into gel and carry the same, the carrying material carrying the surfactant, namely, the surfactant-containing composition, can be preserved without being sealed airtight in a bag, container, or the like.

The above-arranged carrying material may be optionally made into a sheet or block of complex by being combined with a base material including a woven or non-woven fabric, and a knitted cloth both made of a hydrophilic or hydrophobic fiber; pulp, paper; and a porous product, such as a sponge; etc. Examples of the hydrophilic fiber are cotton, wool, rayon, acetate, vinylon, etc. Examples of the hydrophobic fiber are polyester, polyacrylonitrile, polyamide, polypropylene, polyethylene, polyvinyl chloride, polyurethane, glass wool, rock wool, etc. Examples of the material of the porous product are polyacetal, polyurethane, cellulose, phenol resin, etc. Material, shape, arrangement and the like of the base material are not especially limited.

Figure 1:
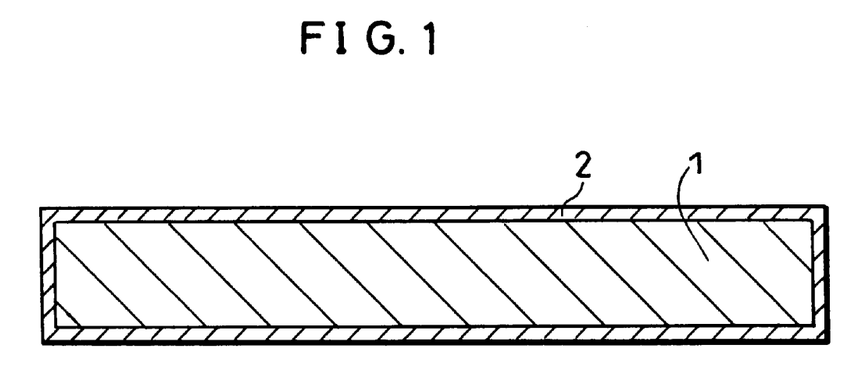
FIG. 1 is a schematic cross section showing an example complex composed of a carrying material of the present invention and a base material.

A complex is made by combining the carrying material and base material in a manner illustrated in FIG. 1, for example. More specifically, a carrying material 1 is filled in a base material 2 of a sack-wise shape. The carrying material 1 may be filled in the base material 2 before or after it has carried the surfactant, that is, before or after it has been made into the surfactant-containing composition. Accordingly, the carrying material 1 (or surfactant-containing composition) can be made into a complex of an adequate shape (adequate size of block). The base material 2 is not limited to those of the sack-wise shape.

Figure 2:
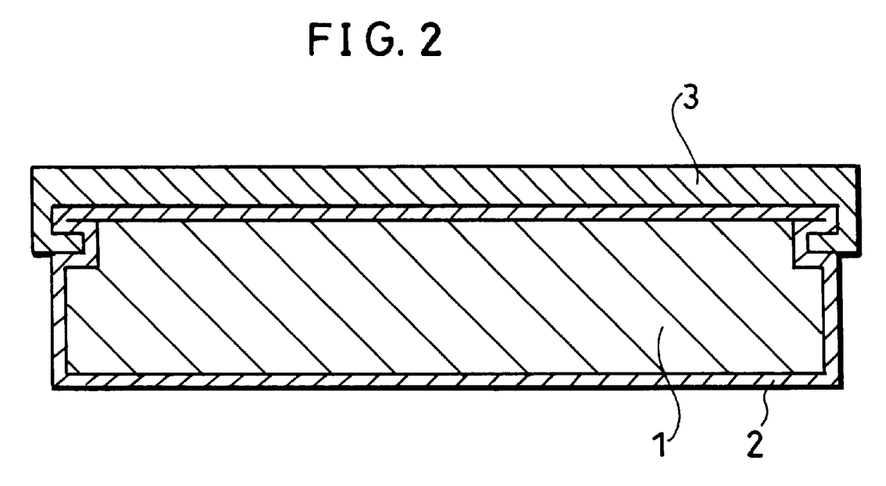
FIG. 2 is a schematic cross section showing the above example complex attached with a handle.

Further, as shown in FIG. 2, an additional handle 3 made of synthetic resin or the like may be attached to the base material 2 at an adequate position. This arrangement makes the complex more easy to carry and use. A shape of the handle 3 is not especially limited, and the handle 3 may be a plate covering half the surface of the base material 2, for example.

The complex thus made can be suitably used when cleaning the floor, wall, toilet, and furniture, or washing an automobile. The use of the carrying material (or surfactant-containing composition) or complex is not especially limited.

In the following, the present invention is described in detail by ways of Examples and Comparative Examples, but the present invention is not limited to Examples below. In the Examples and Comparative Examples, a term "part(s)" means "part(s) by weight" unless otherwise specified, and a liquid absorbency of the crosslinked polymer (A) is measured in the following manner.

(a) Absorbency of Crosslinked Polymer (A)

First, about 0.3 g of the crosslinked polymer (A) is placed evenly in a tea-bag sack, and the sack is dipped in an ion exchange water for 3 hours. After the sack is drained for a predetermined period, a weight $W_1$ (g) of the sack is measured. The same is carried out using an empty tea-bag sack to measure a weight $W_0$ (g). Then, absorbency (g/g) is computed as:

$$\text{Absorbency(g/g)} = \frac{\text{Weight } W_1 \text{ (g)} - \text{Weight } W_0 \text{ (g)}}{\text{Weight of Crosslinked Polymer } (A) \text{ (g)}}$$

The absorbency thus computed is an equilibrium value.

EXAMPLE 1

To begin with, 60.4 parts of sodium acrylate serving as a copolymerizable monomer, 339.6 parts of methoxy polyethylene glycol acrylate serving as a monomer based on (meth) acrylic ester, 593.0 parts of ion exchange water serving as a solvent, and 1.8 part of polyethylene glycol diacrylate serving as a crosslinking agent are placed in a plastic reactor of 600 ml equipped with a thermometer, a nitrogen gas blowing pipe, and a stirring device to prepare a reactant liquid. An average number of addition moles of an ethylene oxide (hereinafter, referred to as EO) in methoxypolyethylene glycol acrylate is 10. Also, an average number of addition moles of EO in polyethylene glycol diacrylate is 8.

In other words, sodium acrylate and methoxypolyethylene glycol acrylate are placed in a mole ratio of 50:50. Also, polyethylene glycol diacrylate is placed in such a manner that a ratio of the same with respect to the above monomeric component is 0.3 mol %.

Then, a nitrogen gas is blown into the reactant liquid to eliminate remaining oxygen dissolved therein, and to displace a reactant system with a nitrogen gas. Subsequently, the reactant liquid is heated to 40° C. using a water bath, and 5.2 parts of 10 wt % aqueous solution of 2,2'-azobis(2-amidinopropane)hydrochloride (V-50 of Wako Pure Chemical Industries, Ltd.) serving as a polymerization initiator is added. The reactant liquid is stirred and mixed, and a polymerization reaction takes place as soon as the stirring is stopped. Here, 2,2'-azobis(2-amidinopropane)hydrochloride is added in such a manner that a ratio of the same with respect to the monomeric component is 0.15 mol %.

A temperature of the reactant liquid rises to a peak of 64° C. after 46 minutes since the polymerization reaction has started. A temperature of the water bath is raised to match the temperature of the reactant liquid. After the temperature of the reactant liquid has reached its peak, the reactant liquid is subject to maturing for 60 minutes while the water bath is kept at 80° C., after which a resulting hydrous gel polymer is taken out and cracked into microscopic powders.

The microscopic powders of hydrous gel polymer are dried for 1 hour at 150° C. in a nitrogen gas flow using a hot air recirculating drier, and pulverized by a bench pulverizer to produce the crosslinked polymer (A). Absorbency of the resulting crosslinked polymer (A) measured in the above manner is 116 g/g.

Then, polyethylene glycol nonylphenyl ether serving as the nonionic surfactant is dissolved into ion exchange water to prepare 100 ppm aqueous solution of polyethylene glycol nonylphenyl ether, namely, a surfactant-containing solution. An average number of addition moles in polyethylene glycol nonylphenyl ether is 9.

Then, 50 parts of polyethylene glycol nonylphenyl ether aqueous solution thus prepared is placed in a 100 ml beaker, and 0.1 part of the above crosslinked polymer (A), namely, the absorbing agent, is added and the reactant solution is stirred for 5 hours. After the stirring is stopped, the absorbing agent precipitates in the form of gel. Subsequently, the aqueous solution is filtered to isolate precipitate, and a concentration of polyethylene glycol nonylphenyl ether in the filtrate measured by high-performance liquid chromatography (HPLC) is 8 ppm. That is to say, after the polyethylene glycol nonylphenyl ether aqueous solution is treated with the absorbing agent, a concentration of polyethylene glycol nonylphenyl ether is reduced to as low as 8 ppm from 100 ppm. Moreover, it is discovered that the absorbing agent has absorbed 0.046 g/g of polyethylene glycol nonylphenyl ether serving as the surfactant.

EXAMPLE 2

Herein, 26.4 parts of sodium methacrylate serving as a copolymerizable monomer, 573.6 parts of butoxypolyethylene glycol methacrylate serving as a monomer based on (meth)acrylic ester, 397.6 parts of ion exchange water, and 0.45 part of polyethylene glycol diacrylate are placed into a reactor identical with the one used in Example 1 to prepare a reactant liquid. An average number of addition moles of EO in the butoxypolyethylene glycol acrylate is 50, and an average number of addition moles of EO in polyethylene glycol diacrylate is 8.

In other words, sodium methacrylate and butoxypolyethylene glycol methacrylate are placed in a mole ratio of 50:50. Also, polyethylene glycol diacrylate is placed in such a manner that a ratio of the same with respect to the monomeric component is 0.2 mol %.

Then, a nitrogen gas is blown into the reactant liquid to eliminate oxygen dissolved therein, and to displace a reactant system with a nitrogen gas. Subsequently, the reactant liquid is heated to 50° C. using a water bath, and 2.0 parts of 10 wt % aqueous solution of 2,2'-azobis(2-amidinopropane)hydrochloride (V-50 of Wako Pure Chemical Industries, Ltd.) is added. The reactant liquid is stirred and mixed, and a polymerization reaction takes place as soon as the stirring is stopped. Here, 2,2'-azobis (2-amidinopropane) hydrochloride is added in such a manner that a ratio of the same with respect to the monomeric component is 0.15 mol %.

A temperature of the reactant liquid rises to a peak of 60° C. after 116 minutes since the polymerization reaction has started. A temperature of the water bath is raised to match the temperature of the reactant liquid. After the temperature of the reactant liquid has reached its peak, the reactant liquid is subject to maturing for 60 minutes while the water bath is kept at 80° C., after which a resulting hydrous gel polymer is taken out and cracked into microscopic powders.

The microscopic powders of hydrous gel polymer are dried and pulverized in the same manner as Example 1 to produce the crosslinked polymer (A). Absorbency of the resulting crosslinked polymer (A) measured in the above manner is 75 g/g.

Then, 100 ppm aqueous solution of polyethylene glycol nonylphenyl ether is treated in the same manner as Example 1 and a concentration of polyethylene glycol nonylphenyl ether in the filtrate measured in the same manner as Example 1 is 13 ppm. Also, it is discovered that the absorbing agent has absorbed 0.0435 g/g of polyethylene glycol nonylphenyl ether.

EXAMPLE 3

Herein, 190.8 parts of sodium methacrylate, 409.2 parts of methoxypolyethylene glycol methacrylate serving as a monomer based on (meth)acrylic ester, 383.9 parts of ion exchange water, and 5.9 parts of polyethylene glycol diacrylate are placed into a reactor identical with the one used in Example 1 to prepare a reactant liquid. An average nuaverage number of addition moles of EO in the methoxypolyethylene glycol acrylate is 10, and an average number of addition moles of EO in polyethylene glycol diacrylate is 8.

In other words, sodium methacrylate and methoxypolyethylene glycol methacrylate are placed in a mole ratio of 70:30. Also, polyethylene glycol diacrylate is placed in such a manner that a ratio of the same with respect to the monomeric component is 0.5 mol %.

Then, a nitrogen gas is blown into the reactant liquid to eliminate remaining oxygen dissolved therein, and to displace a reactant system with a nitrogen gas. Subsequently, the reactant liquid is heated to 45° C. using a water bath, and 10.3 parts of 10 wt % aqueous solution of 2,2'-azobis(2-amidinopropane)hydrochloride (V-50 of Wako Pure Chemical Industries, Ltd.) is added. The reactant liquid is stirred and mixed, and a polymerization reaction takes place as soon as the stirring is stopped. Here, 2,2'-azobis (2-amidinopropane) hydrochloride is added in such a manner that a ratio of the same with respect to the monomeric component is 0.15 mol %.

A temperature of the reactant liquid rises to a peak of 93° C. after 88 minutes since the polymerization reaction has started. A temperature of the water bath is raised to match the temperature of the reactant liquid. After the temperature of the reactant liquid has reached its peak, the reactant liquid is subject to maturing for 60 minutes while the water bath is kept at 80° C., after which a resulting hydrous gel polymer is taken out and cracked into microscopic powders.

The microscopic powders of hydrous gel polymer are dried and pulverized in the same manner as Example 1 to produce the crosslinked polymer (A). Absorbency of the resulting crosslinked polymer (A) measured in the above manner is 116 g/g.

Then, 100 ppm aqueous solution of polyethylene glycol nonylphenyl ether is treated in the same manner as Example 1 and a concentration of polyethylene glycol nonylphenyl ether in the filtrate measured in the same manner as Example 1 is 24 ppm. Also, it is discovered that the absorbing agent has absorbed 0.038 g/g of polyethylene glycol nonylphenyl ether.

EXAMPLE 4

Herein, 246.8 parts of sodium acrylate, 153.2 parts of methoxypolyethylene glycol acrylate, 574.6 parts of ion exchange water, and 13.5 parts of polyethylene glycol diacrylate are placed into a reactor identical with the one used in Example 1 to prepare a reactant liquid. An average number of addition moles of EC in the methoxypolyethylene glycol acrylate is 10, and an average number of addition moles of EO in polyethylene glycol diacrylate is 8.

In other words, sodium acrylate and methoxypolyethylene glycol acrylate are placed in a mole ratio of 90:10. Also, polyethylene glycol diacrylate is placed in such a manner that a ratio of the same with respect to the monomeric component is 1 mol %.

Then, a nitrogen gas is blown into the reactant liquid to eliminate remaining oxygen dissolved therein, and to displace a reactant system with a nitrogen gas. Subsequently, the reactant liquid is heated to 40° C. using a water bath, and 11.9 parts of 10 wt % aqueous solution of 2,2'-azobis(2-amidinopropane)hydrochloride (V-50 of Wako Pure Chemical Industries, Ltd.) is added. The reactant liquid is stirred and mixed, and a polymerization reaction takes place as soon as the stirring is stopped. Here, 2,2'-azobis(2-amidinopropane) hydrochloride is added in such a manner that a ratio of the same with respect to the monomeric component is 0.15 mol %.

A temperature of the reactant liquid rises to a peak of 95° C. after 33 minutes since the polymerization reaction has started. A temperature of the water bath is raised to match the temperature of the reactant liquid. After the temperature of the reactant liquid has reached its peak, the reactant liquid is subject to maturing for 60 minutes while the water bath is kept at 80° C., after which a resulting hydrous gel polymer is taken out and cracked into microscopic powders.

The microscopic powders of hydrous gel polymer are dried and pulverized in the same manner as Example 1 to produce the crosslinked polymer (A). Absorbency of the resulting crosslinked polymer (A) measured in the above manner is 86 g/g.

Then, 100 ppm aqueous solution of polyethylene glycol nonylphenyl ether is treated in the same manner as Example 1 and a concentration of polyethylene glycol nonylphenyl ether in the filtrate measured in the same manner as Example 1 is 32 ppm. Also, it is discovered that the absorbing agent has absorbed 0.034 g/g of polyethylene glycol nonylphenyl ether.

EXAMPLE 5

Herein, 5 parts of polyethylene glycol serving as polyalkylene glycol is dissolved into 95 parts of ion exchange water serving as a solvent in a plastic reactor of 100 ml to prepare an aqueous solution. A molecular weight of polyethylene glycol ranges from 150,000 to 400,000.

Then, 20 KGY of τ rays are irradiated to the above aqueous solution, and the resulting hydrous gel polymer is taken out and cracked into microscopic powders. Then, the microscopic powders are dried at 60° C. under a reduced pressure and pulverized using a bench pulverizer to produce the crosslinked polymer (A). Absorbency of the resulting crosslinked polymer (A) measured in the above manner is 31 g/g.

Then, 100 ppm aqueous solution of polyethylene glycol nonylphenyl ether is treated in the same manner as Example 1 and a concentration of polyethylene glycol nonylphenyl ether in the filtrate measured in the same manner as Example 1 is 17 ppm. Also, it is discovered that the absorbing agent has absorbed 0.0415 g/g of polyethylene glycol nonylphenyl ether.

Comparative Example 1

A crosslinked polymer based on sodium polyacrylate having liquid absorbency of 96 g/g (which is water absorbent resin, more specifically, Aqualick GH-2 of Nippon Shokubai Co., Ltd.) is used as a comparative absorbing agent. Then, 100 ppm aqueous solution of polyethylene glycol nonylphenyl ether is treated in the same manner as Example 1 and a concentration of polyethylene glycol nonylphenyl ether in the filtrate measured in the same manner as Example 1 is 87 ppm, meaning that polyethylene glycol nonylphenyl ether is hardly absorbed in the comparative absorbing agent. Also, it is discovered that the comparative absorbing agent has absorbed as small as 0.0065 g/g of polyethylene glycol nonylphenyl ether.

Examples 1–5 above reveal that, since the crosslinked polymer (A) contained in the absorbing agent of the present invention has a polyoxyalkylene chain, for example, the absorbing agent renders excellent surfactant absorbing ability, thereby making it possible to remove the surfactant efficiently. In short, the above absorbing agent can absorb at least 0.01 g/g of the surfactant. In contrast, since the crosslinked polymer contained in the comparative absorbing agent in Comparative Example 1 does not have a polyoxyalkylene chain, the comparative absorbing agent is inferior to the absorbing agent of the present invention in surfactant absorbing ability. As a result, the surfactant is not removed as efficiently as was in Examples 1–5.

EXAMPLE 6

Used as a reactor herein is a 2.5 l-bench kneader whose inner surface is lined with ethylene trifluoride and equipped with a thermometer and a jacket. Hot water is supplied into the jacket. Here, 250.0 parts of methoxy polyethylene glycol methacrylate (the number of addition moles of EO: 9) serving as a monomer based on (meth)acrylic ester, 581.4 parts of 43 wt % aqueous solution of sodium methacrylate serving as a copolymerizable monomer, 164.8 parts of ion exchange water serving as a solvent, and 2.6 parts of polyethylene glycol dimethacrylate (the number of addition moles of EO: 8) are placed in the reactor to prepare a reactant liquid. Methoxy polyethylene glycol methacrylate is methacrylic ester expressed by General Formula (2) above, where R is a methyl group, $X^2$ is an ethylene oxide, $Y^2$ is a methoxy group, and n is 9. A weight ratio of the monomeric component (methoxy polyethylene glycol methacrylate/sodium methacrylate) is 50/50. A ratio of polyethylene glycol dimethacrylate to the monomeric component is 0.2 mol %.

Then, while the reactant liquid is kept at 40° C. (reaction starting temperature), 1.16 part of 2,2'-azobis(2-amidinopropane)hydrochloride serving as a polymerization initiator is added to the reactant liquid with stirring by the blade in a nitrogen gas flow to start the polymerization. After the reactant liquid is stirred for 20 seconds to dissolve 2,2'-azobis(2-amidinopropane)hydrochloride completely, the reactant liquid is allowed to stand. A ratio of 2,2'-azobis(2-amidinopropane)hydrochloride to the monomeric component is 0.15 mol %.

A polymerization reaction takes place as soon as 2,2'-azobis(2-amidinopropane)hydrochloride is added, and a temperature of the reactant liquid rises to a peak of 84° C. after 120 minutes since the polymerization reaction has started. A temperature of hot water supplied to the jacket is raised to match the temperature of the reactant liquid. Subsequently, after the reactant liquid is cooled to 80° C., a reaction product, namely, hydrous gel polymer, is subjected to maturing for 1 hour, and pulverized into a microscopic size by rotating the blade of the kneader for 10 minutes at 40 rpm. Then, the rotation of the kneader is reversed and the resulting hydrous gel polymer is taken out.

The resulting hydrous gel polymer is dried for 4 hours at 120° C. using a hot air recirculating drier. A resulting dried product, namely, the crosslinked polymer (B), is pulverized using a simple bench pulverizer (Kyoritsu Riko K.K.) to produce a carrying material out of the crosslinked polymer (B).

Then, the physical properties of the carrying material thus produced are evaluated in the following manner. To begin with, 10 g of 50 wt % aqueous solution of polyoxyethylene nonylphenyl ether (Emalgen 909 of Kao Corporation, HLB 12.4) serving as the nonionic surfactant is put into a glass screw pipe of 20 ml (Maruemu K.K.). Then, 0.3 g of the carrying material is added to the above aqueous solution and the aqueous solution is stirred until it becomes homogenous. Here, an adding amount of the carrying material based on a weight of the aqueous solution is 3 wt %.

After the resulting mixed product is allowed to stand for 1 hour at room temperature, the screw pipe is laid down to observe the state of the mixed product, namely, the content. By so doing, whether or not the carrying material can turn the surfactant into gel to carry the same is checked. After 30 seconds since the screw pipe is laid down at room temperature, the content (surfactant-containing composition) shows no fluidity, meaning that the same is completely turned into gel, a result of which is set forth in Table 1 below.

EXAMPLE 7

A carrying material is produced out of the crosslinked polymer (B) through the same reaction and manipulation as those in Example 6 except that a weight ratio of the monomeric component (methoxypolyethylene glycol methacrylate/sodium methacrylate) is changed to 20/80 from 50/50.

The physical properties of the resulting carrying material are evaluated in the same manner as Example 6. Then, after 30 seconds since the screw pipe is laid down at room temperature, the content (surfactant-containing composition) shows slight fluidity, meaning that the same is substantially turned into gel, a result of which is set forth in Table 1 below.

EXAMPLE 8

A carrying material is produced out of the crosslinked polymer (B) through the same reaction and manipulation as those in Example 6 except that a weight ratio of the monomeric component (methoxypolyethylene glycol methacrylate/sodium methacrylate) is changed to 95/5 from 50/50.

The physical properties of the resulting carrying material are evaluated in the same manner as Example 6. Then, after 30 seconds since the screw pipe is laid down at room temperature, the content (surfactant-containing composition) shows slight fluidity, meaning that the same is substantially turned into gel, a result of which is set forth in Table 1 below.

EXAMPLE 9

A carrying material is produced out of the crosslinked polymer (B) through the same reaction and manipulation as those in Example 6 except that butoxypolyethylene glycol methacrylate (the number of addition moles of EO: 70) is used instead of methoxy polyethylene glycol methacrylate as a monomer based on (meth)acrylic ester. Butoxypolyethylene glycol methacrylate is a methacrylic ester expressed by General Formula (2) above, where R is a methyl group, $X^2$ is an ethylene oxide, $Y^2$ is a butoxy group, and n is 70.

The physical properties of the resulting carrying material are evaluated in the same manner as Example 6. Then, after 30 seconds since the screw pipe is laid down at room temperature, the content (surfactant-containing composition) shows slight fluidity, meaning that the same is substantially turned into gel, a result of which is set forth in Table 1 below.

EXAMPLE 10

A carrying material is produced out of the crosslinked polymer (B) through the same reaction and manipulation as those in Example 6 except that a part of 581.4 parts of 43 wt % aqueous solution of sodium methacrylate is replaced with an aqueous solution of acrylic acid serving as a copolymerizable monomer. A weight ratio of methoxy polyethylene glycol methacrylate, sodium methacrylate, and acrylic acid (methoxy polyethylene glycol methacrylate/sodium methacrylate/acrylic acid) is 50/25/25.

The physical properties of the resulting carrying material are evaluated in the same manner as Example 6. Then, after 30 seconds since the screw pipe is laid down at room temperature, the content (surfactant-containing composition) shows no fluidity, meaning that the same is completely turned into gel, a result of which is set forth in Table 1 below.

EXAMPLE 11

A carrying material is produced out of the crosslinked polymer (B) through the same reaction and manipulation as those in Example 6. Then, the physical properties of the resulting carrying material are evaluated in the same manner as Example 6 except that log of 10 wt % aqueous solution of sodium dodecylbenzenesulfonate (Neopelex No. 25 of Kao Corporation) is used as an anionic surfactant instead of 50 wt % aqueous solution of polyoxyethylene nonylphenyl ether. Here, an adding amount of the carrying material based on a weight of the aqueous solution is 3 wt %.

Then, after 30 seconds since the screw pipe is laid down at room temperature, the content (surfactant-containing composition) shows no fluidity, meaning that the same is completely turned into gel, a result of which is set forth in Table 1 below.

EXAMPLE 12

A carrying material is produced out of the crosslinked polymer (B) through the same reaction and manipulation as those in Example 6. Then, the physical properties of the resulting carrying material are evaluated in the same manner as Example 6 except that log of 40 wt % aqueous solution of polyoxyethylene alkyl ether (Sophthanol 90 of Nippon Shokubai Co., Ltd., HLB 13.3) is used as the nonionic surfactant instead of 50 wt % of aqueous solution of polyoxyethylene nonylphenyl ether, and that an amount of the carrying material is increased to 0.5 g from 0.3 g. Here, an adding amount of the carrying material based on a weight of the aqueous solution is 5 wt %.

Then, after 30 seconds since the screw pipe is laid down at room temperature, the content (surfactant-containing composition) shows no fluidity, meaning that the same is completely turned into gel, a result of which is set forth in Table 1 below.

Comparative Example 2

Here, 4,000 parts of 43 wt % aqueous solution of acrylate-based monomeric component made of 74.95 mol % of sodium acrylate, 25.0 mol % of acrylic acid, and 0.05 mol % of trimethylolpropane triacrylate is placed into a given reactor equipped with a thermometer and the like as a reactant liquid.

Then, after 0.6 part of ammonium persulfate and 0.2 part of sodium hydrogen sulfite are added and dissolved into the reactant liquid in a nitrogen gas flow, the reactant liquid is allowed to stand, so that standing polymerization takes place for a predetermined period at 55–80° C. Then, a reactant product, namely, hydrous gel polymer, is pulverized into a microscopic size.

The resulting hydrous gel polymer is dried for a predetermined period at 180° C. using a hot air recirculating drier. The resulting dried product, namely, a comparative crosslinked polymer, is pulverized using a bench simple pulverizer (Kyoritsu Riko K.K.) to produce a comparative carrying material.

Then, the physical properties of the resulting comparative carrying material are evaluated in the same manner as Example 6. Then, after 30 seconds since the screw pipe is laid down at room temperature, the content (comparative surfactant-containing composition) shows obvious fluidity and has not turned into gel, a result of which is set forth in Table 1 below.

Comparative Example 3

A comparative carrying material is obtained through the same reaction and manipulation as those in Comparative Example 2. Then, the physical properties of the resulting comparative carrying material are evaluated in the same manner as Example 11. Then, after 30 seconds since the screw pipe is laid down at room temperature, the content (comparative surfactant-containing composition) shows obvious fluidity and has not turned into gel, a result of which is set forth in Table 1 below.

Comparative Example 4

A comparative carrying material is obtained through the same reaction and manipulation as those in Comparative Example 2. Then, the physical properties of the resulting comparative carrying material are evaluated in the same manner as Example 12. Then, after 30 seconds since the screw pipe is laid down at room temperature, the content (comparative surfactant-containing composition) shows obvious fluidity, and has not turned into gel, a result of which is set forth in Table 1 below.

TABLE 1

| EXAMPLE/ COMPARATIVE EXAMPLE | SURFACTANT (CONCENTRATION (WT %)) | AMOUNT OF CARRYING MATERIAL (WT %) | RESULT (STATE OF CONTENTS) |
|---|---|---|---|
| 6 | POLYOXYETHYLENE NONYLPHENYL ETHER (NONIONIC SURFACTANT) 50 | 3 | ○ |
| 7 | POLYOXYETHYLENE NONYLPHENYL ETHER (NONIONIC SURFACTANT) 50 | 3 | Δ |
| 8 | POLYOXYETHYLENE NONYLPHENYL ETHER (NONIONIC SURFACTANT) 50 | 3 | Δ |
| 9 | POLYOXYETHYLENE NONYLPHENYL ETHER (NONIONIC SURFACTANT) 50 | 3 | Δ |
| 10 | POLYOXYETHYLENE NONYLPHENYL ETHER (NONIONIC SURFACTANT) 50 | 3 | ○ |
| 11 | SODIUM DODECYLBENZENESULFONATE (ANIONIC SURFACTANT) 10 | 3 | ○ |
| 12 | POLYOXYETHYLENE ALKYL ETHER (NONIONIC SURFACTANT) 40 | 5 | ○ |
| 2 | POLYOXYETHYLENE NONYLPHENYL ETHER 50 | 3 | X |
| 3 | SODIUM DODECYLBENZENESULFONATE 10 | 3 | X |
| 4 | POLYOXYETHYLENE ALKYL ETHER 40 | 5 | X |

○: NO FLUIDITY
Δ: SLIGHT FLUIDITY
X: OBVIOUS FLUIDITY

The results of Examples 6–12 set forth in Table 1 above reveal that the carrying material of the present invention turn the surfactant into gel and carry the same. In contrast, the results of Comparative Examples 2–4 reveal that the comparative carrying material can not turn the surfactant into gel to carry the same.

EXAMPLE 13

To begin with, the crosslinked polymer (B) is produced through the same reaction and manipulation as those in Example 6. Then, 10 g of 50 wt %. aqueous solution of polyoxyethylene nonylphenyl ether (Emalugen 909 of Kao Corporation, HLB 12.4) serving as the nonionic surfactant is placed in a glass screw pipe of 20 ml (Mareumu K.K.), and 0.5 g of perfume and 0.5 g of ethyl alcohol serving as an alcohol are added followed by the adding of 0.3 g of the crosslinked polymer (B). Then, the reactant liquid is stirred homogeneously to produce a mixed material.

The resulting mixed material is allowed to stand for 1 hour at room temperature, and the state of the mixed material, namely, the content, is examined visually. Then, the content (surfactant-containing composition) has turned into gel completely, and no liquid layer portion produced by water separation exists, which reveals that the content is useful as an aromatic composition.

EXAMPLE 14

A mixed material is obtained in the same manner as Example 13 except that 0.5 g of deodorant made of vegetable extract is used instead of 0.5 g of perfume.

Then, the resulting mixed material is allowed to stand for 1 hour at room temperature, and the state of the mixed material, namely, the content, is examined visually. Then, the content (surfactant-containing composition) has turned into gel completely, and no liquid layer portion produced by water separation exists, which reveals that the content is useful as a deodorant composition.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Potential Industrial Use

The absorbing agent of the present invention includes, for example, the crosslinked polymer having a polyoxyalkylene chain. Therefore, the absorbing agent of the present invention renders excellent surfactant absorbing ability. Consequently, the absorbing agent can absorb the surfactant in the solution effectively, thereby making it possible to remove the surfactant in a satisfactory manner, for example.

According to the absorbing method of the present invention, the surfactant contained in the solution is absorbed efficiently, and therefore, the surfactant can be removed in a satisfactory manner. Also, since the absorbing agent precipitates after it has absorbed the surfactant, the surfactant can be removed by a simple manipulation of filter isolation. Consequently, it has become possible to collect and remove the surfactant readily from the surfactant-containing solution in a satisfactory manner at a low cost.

In addition, the carrying material of the present invention not only turns the surfactant into gel to carry the same, but also renders excellent shape keeping property while it carries the surfactant and a property of gradually releasing the surfactant (gradual releasing property). In other words, if the surfactant is carried by the carrying material and used as a detergent, for example, the surfactant becomes more easy to use. Consequently, the cleaning or washing job becomes less tedious and less time consuming.

More specifically, the carrying material containing the surfactant, deodorant, water, optionally a lower alcohol like ethyl alcohol, etc., namely, the composition containing both the surfactant and deodorant, is useful as the deodorant composition. Also, the carrying material containing the surfactant, aromatic (perfume), water, optionally a lower alcohol like ethyl alcohol, etc., namely, the composition containing both the surfactant and aromatic (perfume), is useful as an aromatic composition.

We claim:

1. An absorbing agent characterized by being capable of absorbing at least 0.01 g/g of a surfactant selected from the group consisting of nonionic and anionic surfactants and including a crosslinked polymer having a polyoxyalkylene chain, said crosslinked polymer being produced by polymerizing a monomeric component including (a) a monomer based on (meth)acrylic ester of formula (1):

(1)

where R is a hydrogen atom or a methyl group, $X^1$ is an oxyalkylene group having up to 5 carbon atoms, $Y^1$ is an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average; and (b) at least one monomer selected from the group consisting of a monomer based on an unsaturated monocarboxylic acid and a monomer based on an unsaturated sulfonic acid.

2. An absorbing agent characterized by being capable of absorbing at least 0.01 g/g of a surfactant selected from the group consisting of nonionic and anionic surfactants and including a crosslinked polymer having a polyoxyalkylene chain, said crosslinked polymer being produced by polymerizing a monomeric component including a monomer based on (meth)acrylic ester of formula (1):

(1)

where R is a hydrogen atom or a methyl group, $X^1$ is an oxyalkylene group having up to 5 carbon atoms, $Y^1$ is an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average; wherein said crosslinked polymer is produced by polymerizing said monomeric component in the presence of polyethylene glycol di(meth)acrylate.

3. A carrying material for carrying a surfactant selected from the group consisting of nonionic and anionic surfactants characterized by including a crosslinked polymer produced by polymerizing a monomeric component including (a) a monomer based on (meth)acrylic ester expressed by formula (2):

(2)

where R is a hydrogen atom or a methyl group, $X^2$ is an oxyalkylene group having 2–4 carbon atoms whose mole ratio of an oxyethylene group with respect to all oxyalkylene groups is 50% or more, $Y^2$ is an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average; and (b) at least one monomer selected from the group consisting of a monomer based on an unsaturated monocarboxylic acid and a monomer based on an unsaturated sulfonic acid.

4. A carrying material for carrying a surfactant selected from the group consisting of nonionic and anionic surfactants characterized by including a crosslinked polymer produced by polymerizing a monomeric component including a monomer based on (meth)acrylic ester expressed by formula (2):

(2)

where R is a hydrogen atom or a methyl group, $X^2$ is an oxyalkylene group having 2–4 carbon atoms whose mole ratio of an oxyethylene group with respect to all oxyalkylene groups is 50% or more, $Y^2$ is an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average; wherein said crosslinked polymer is produced by polymerizing said monomeric component in the presence of polyethylene glycol di(meth)acrylate.

5. A carrying material for carrying a surfactant selected from the group consisting of nonionic and anionic surfactants characterized by including a crosslinked polymer produced by polymerizing a monomeric component including a monomer based on (meth)acrylic ester expressed by formula (2):

$$CH_2=CR-CO-(X^2)_n-Y^2 \qquad (2)$$

where R is a hydrogen atom or a methyl group, $X^2$ is an oxyalkylene group having 2–4 carbon atoms whose mole ratio of an oxyethylene group with respect to all oxyalkylene groups is 50% or more, $Y^2$ is an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average; wherein said carrying material is combined with a base material to form a complex.

6. A carrying material for carrying a surfactant selected from the group consisting of nonionic and anionic surfactants characterized by including a crosslinked polymer produced by polymerizing a monomeric component including a monomer based on (meth)acrylic ester expressed by formula (2):

$$CH_2=CR-CO-(X^2)_n-Y^2 \qquad (2)$$

where R is a hydrogen atom or a methyl group, $X^2$ is an oxyalkylene group having 2–4 carbon atoms whose mole ratio of an oxyethylene group with respect to all oxyalkylene groups is 50% or more, $Y^2$ is an alkoxy group having up to 5 carbon atoms, a phenoxy group, or an oxyalkylphenyl group having up to 3 alkyl groups each having up to 9 carbon atoms as a substitutional group, and n is a positive number ranging from 3–100 in average; wherein said carrying material is in the form of an aqueous solution.

7. A surfactant-containing composition characterized by including the carrying material of claim 3, a surfactant selected from the group consisting of nonionic and anionic surfactants, water, alcohol and a deodorant.

* * * * *